US012284444B2

(12) United States Patent
Zu et al.

(10) Patent No.: US 12,284,444 B2
(45) Date of Patent: Apr. 22, 2025

(54) DISPLAY APPARATUS AND CAMERA TRACKING METHOD

(71) Applicant: HISENSE VISUAL TECHNOLOGY CO., LTD., Shandong (CN)

(72) Inventors: Yinpeng Zu, Shandong (CN); Luming Yang, Shandong (CN); Jing Ning, Shandong (CN); Zhikui Wang, Shandong (CN); Qiyan Jia, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 141 days.

(21) Appl. No.: 18/170,982

(22) Filed: Feb. 17, 2023

(65) Prior Publication Data

US 2023/0209204 A1 Jun. 29, 2023

Related U.S. Application Data

(63) Continuation of application No. PCT/CN2021/112797, filed on Aug. 16, 2021.

(30) Foreign Application Priority Data

Aug. 21, 2020 (CN) .......................... 202010848922.3
Jan. 6, 2021 (CN) .......................... 202110013376.6

(51) Int. Cl.
*H04N 23/695* (2023.01)
*G06T 7/246* (2017.01)
(Continued)

(52) U.S. Cl.
CPC ........... *H04N 23/695* (2023.01); *G06T 7/248* (2017.01); *G06T 7/70* (2017.01); *G06V 10/462* (2022.01);
(Continued)

(58) Field of Classification Search
None
See application file for complete search history.

(56) References Cited

U.S. PATENT DOCUMENTS

2006/0204106 A1* 9/2006 Yamaguchi .............. G03B 7/08
382/118
2007/0030381 A1* 2/2007 Maeda ................. H04N 23/673
348/E5.045
(Continued)

FOREIGN PATENT DOCUMENTS

CN 101807300 A 8/2010
CN 105812652 A 7/2016
(Continued)

OTHER PUBLICATIONS

International Search Report, mailed Nov. 8, 2021, from PCT/CN2021/112797.
(Continued)

*Primary Examiner* — Paul M Berardesca
(74) *Attorney, Agent, or Firm* — Workman Nydegger

(57) ABSTRACT

Provided are a display apparatus and a method. The display apparatus includes a display, an interface component configured to connect with a rotatable camera and a controller. The controller is configured for: obtaining a reference image captured by the camera, where the reference image comprises one or more persons with one or more face patterns; extracting a tracking target area from the reference image according to a current imaging parameter of the camera, where the tracking target area is a regular-shaped area determined according to one or more weights for the one or more face patterns, the current imaging parameter of the camera comprises a focal length of the lens component of the camera; and sending a rotation instruction to the camera to adjust an orientation of the camera to cause the tracking
(Continued)

target area locate in a middle area of an image presented on the display.

14 Claims, 13 Drawing Sheets

(51) Int. Cl.
    *G06T 7/70*     (2017.01)
    *G06V 10/46*     (2022.01)
    *G06V 40/16*     (2022.01)
    *H04N 23/611*     (2023.01)

(52) U.S. Cl.
    CPC ......... *G06V 40/168* (2022.01); *H04N 23/611* (2023.01)

(56) References Cited

U.S. PATENT DOCUMENTS

| | | | | |
|---|---|---|---|---|
| 2007/0065134 A1* | 3/2007 | Sugimoto | .............. | H04N 23/71 396/165 |
| 2010/0073497 A1* | 3/2010 | Katsumata | ............. | H04N 23/66 348/E5.042 |
| 2010/0157135 A1 | 6/2010 | Dossaji et al. | | |
| 2011/0249961 A1 | 10/2011 | Brunner | | |
| 2012/0327179 A1* | 12/2012 | Watson | ................ | H04N 23/661 348/E7.083 |
| 2022/0094843 A1* | 3/2022 | Mizobuchi | ........... | H04N 23/611 |
| 2023/0054623 A1* | 2/2023 | Takahashi | ............ | G06V 40/168 |

FOREIGN PATENT DOCUMENTS

| | | | |
|---|---|---|---|
| CN | 109348088 A | | 2/2019 |
| CN | 109977770 A | | 7/2019 |
| CN | 110460772 A | | 11/2019 |
| CN | 111131693 A | | 5/2020 |
| CN | 111368678 A | | 7/2020 |
| CN | 112507829 A | * | 3/2021 |
| CN | 112866773 A | | 5/2021 |
| IN | 106161953 A | | 11/2016 |
| WO | 2019179441 A1 | | 9/2019 |

OTHER PUBLICATIONS

Chinese Office Action, mailed Oct. 10, 2022, from Chinese App. No. 202110013376.6.

\* cited by examiner

DISPLAY APPARATUS AND CAMERA TRACKING METHOD

CROSS-REFERENCE OF RELATED APPLICATIONS

The application is a continuation application of International Application No. PCT/CN2021/112797 filed Aug. 16, 2021, which claims the priorities from Chinese Patent Application No. 202010848922.3 filed on Aug. 21, 2020, and Chinese Patent Application No. 202110013376.6 filed on Jan. 6, 2021, which are hereby incorporated by reference in their entirety.

TECHNICAL FIELD

The disclosure relates to the field of smart display technology, and in particular, to a display apparatus and a camera tracking method.

BACKGROUND

Display apparatuses have received extensive attention from users, due to the abilities for playing audios, videos and images.

With the developments of big data and artificial intelligence, the users' demands for functions of display apparatuses are increasing day by day. For example, a user wants to see multiple video chat images while the video images are being displayed; or, when the user is in a game scene, the participants' real images are shown in real time; or, when using an educational application, besides watching the images displayed for learning, the student wants to interact with parents/teachers in real time by audio/video chat.

SUMMARY

The disclosure provides a display apparatus, including: a display configured to display an image from broadcast system or Internet, and/or, a user interface; an interface component configured to connect with a rotatable camera, where the rotatable camera has a lens component and is configured to capture an image; a controller in connection with the display and interface component and configured to cause the display apparatus to perform: obtaining a reference image captured by the camera, where the reference image comprises one or more persons with one or more face patterns; extracting a tracking target area from the reference image according to a current imaging parameter of the camera, where the tracking target area is a regular-shaped area determined according to one or more weights for the one or more face patterns, the current imaging parameter of the camera comprises a focal length of the lens component of the camera; and sending a rotation instruction to the camera to adjust an orientation of the camera to cause the tracking target area locate in a middle area of an image presented on the display.

The disclosure further provides a method for a display apparatus. The method includes: obtaining a reference image captured by a camera, where the reference image comprises one or more persons with one or more face patterns; where the display apparatus comprises a display configured to display an image from broadcast system or Internet, and/or, a user interface, an interface component configured to connect with the camera being rotatable, where the rotatable camera has a lens component and is configured to capture an image; extracting a tracking target area from the reference image according to a current imaging parameter of the camera, where the tracking target area is a regular-shaped area determined according to one or more weights for the one or more face patterns, the current imaging parameter of the camera comprises a focal length of the lens component of the camera; and sending a rotation instruction to the camera to adjust an orientation of the camera to cause the tracking target area locate in a middle area of an image presented on the display.

DETAILED DESCRIPTION

Figure 1:
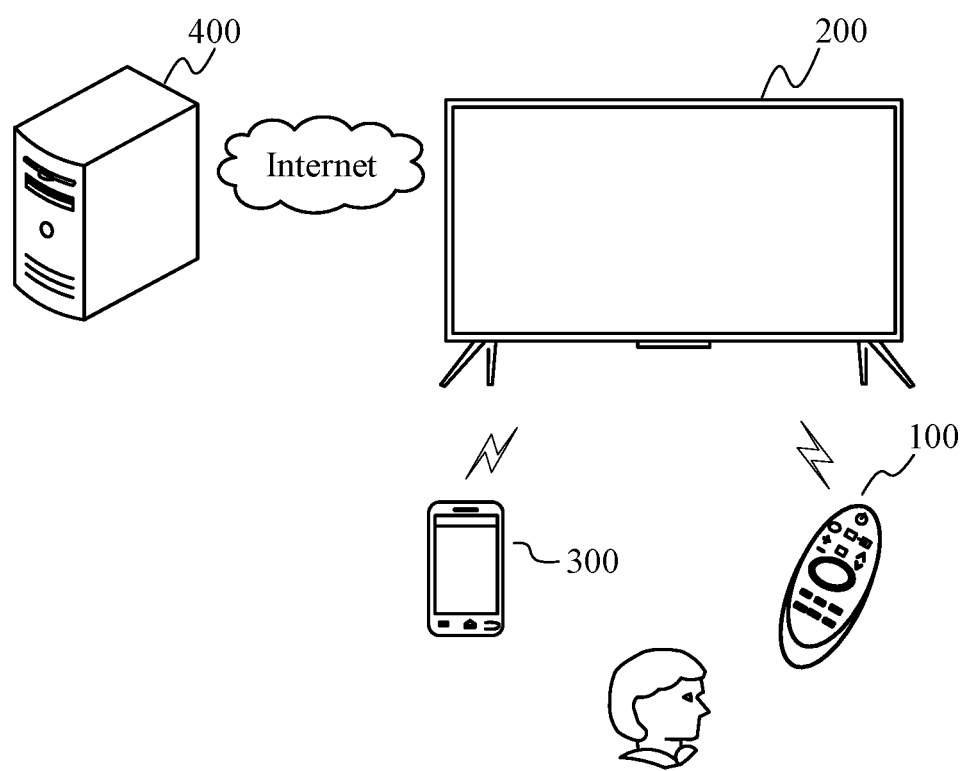
FIG. 1 shows a schematic diagram of an operation scenario between a display apparatus and a control device according to an embodiment of the disclosure.

The embodiments will be illustrated below in detail, and the examples thereof are illustrated in the drawings. When the following description relates to the drawings, the same numerals represent the same or similar elements in the different drawings, unless otherwise indicated. The implementations described in the following embodiments do not represent all the implementations consistent with the disclosure, and are merely examples of systems and methods consistent with some aspects of the disclosure as recited in the claims.

Based upon the exemplary embodiments described in the disclosure, all of other embodiments obtained by those ordinary skilled in the art without creative work pertain to the protection scope of the appended claims of the disclosure. Moreover, although the content disclosed in the disclosure is discussed according to one or more exemplary examples, it should be understood that each aspect of the disclosure may also constitute a complete embodiment separately.

It should be noted that the brief description of the terms in the disclosure is only for the convenience of understanding the embodiments described hereafter, and is not intended to limit the embodiments of the disclosure. Unless otherwise indicated, these terms should be understood according to the plain and ordinary meanings.

The terms such as "first", "second", etc. in the specification, claims and drawings of the disclosure are used to distinguish similar objects, but not necessarily to indicate a particular order or sequence, unless otherwise indicated. It should be understood that the terms used in this way is interchangeable under appropriate circumstances, for example, it can be implemented in an order other than those given in the illustration or description of the embodiments of the disclosure.

In addition, the terms "include" and "have" and any variations thereof mean covering but non-exclusive inclusion, for example, a product or device that contains a series of components is not necessarily limited to those components listed clearly, but may include other components not listed clearly or inherent to the product or device.

The term "remote control" used in the disclosure refers to a component of an electronic device (such as a display apparatus disclosed in the disclosure), which can generally control the electronic device wirelessly within a relatively short distance range. This component is generally connected with an electronic device by using the infrared ray and/or Radio Frequency (RF) signal and/or Bluetooth, and may also include the WiFi, wireless USB, Bluetooth, motion sensor and other functional modules. For example, the handheld touch remote controller uses a user interface in the touch screen to replace most of the physical built-in physical keys in the general remote control device.

FIG. 1 illustrates a schematic diagram of an operating scenario between a display apparatus and a control device in an embodiment. As shown in FIG. 1, a user can operate a display apparatus 200 through a control device 100 or a smart terminal 300.

In some embodiments, the control device 100 can be a remote control, and can communicate with the display apparatus 200 through infrared protocol communication, Bluetooth protocol communication, or other short-distance communication methods, to control the display apparatus 200 through wireless or other wired methods. A user can input user commands through keys, voice input and control panel input on the remote control, to control the display apparatus 200. For example, the user can input corresponding commands through the volume up and volume down keys, channel keys, up/down/left/right directional keys, voice input key, menu key, power key and the like on the remote control, to control the functions of the display apparatus 200.

In some embodiments, a smart terminal 300 (such as a mobile terminal, a tablet computer, a computer, a laptop computer, etc.) may be used to control the display apparatus 200 via, for example, an application running on the smart terminal.

In some embodiments, the command for controlling the display apparatus may not be received via the above-mentioned smart terminal or control device, but based on user' touch or gesture.

In some embodiments, the display apparatus 200 may also be controlled in a manner other than the control device 100 and the smart terminal 300. For example, the user's voice command may be directly received by a module for acquiring voice commands configured inside the display apparatus 200, or the user's voice command may be received by a voice control device provided outside the display apparatus 200.

In some embodiments, the display apparatus 200 also communicates data with the server 400. The display apparatus 200 may be allowed to perform the communication and connection through a Local Area Network (LAN), a Wireless Local Area Network (WLAN), and other networks. The server 400 may provide various contents and interactions to the display apparatus 200. The server 400 may be one or more clusters, and may include one or more types of servers.

Figure 2:
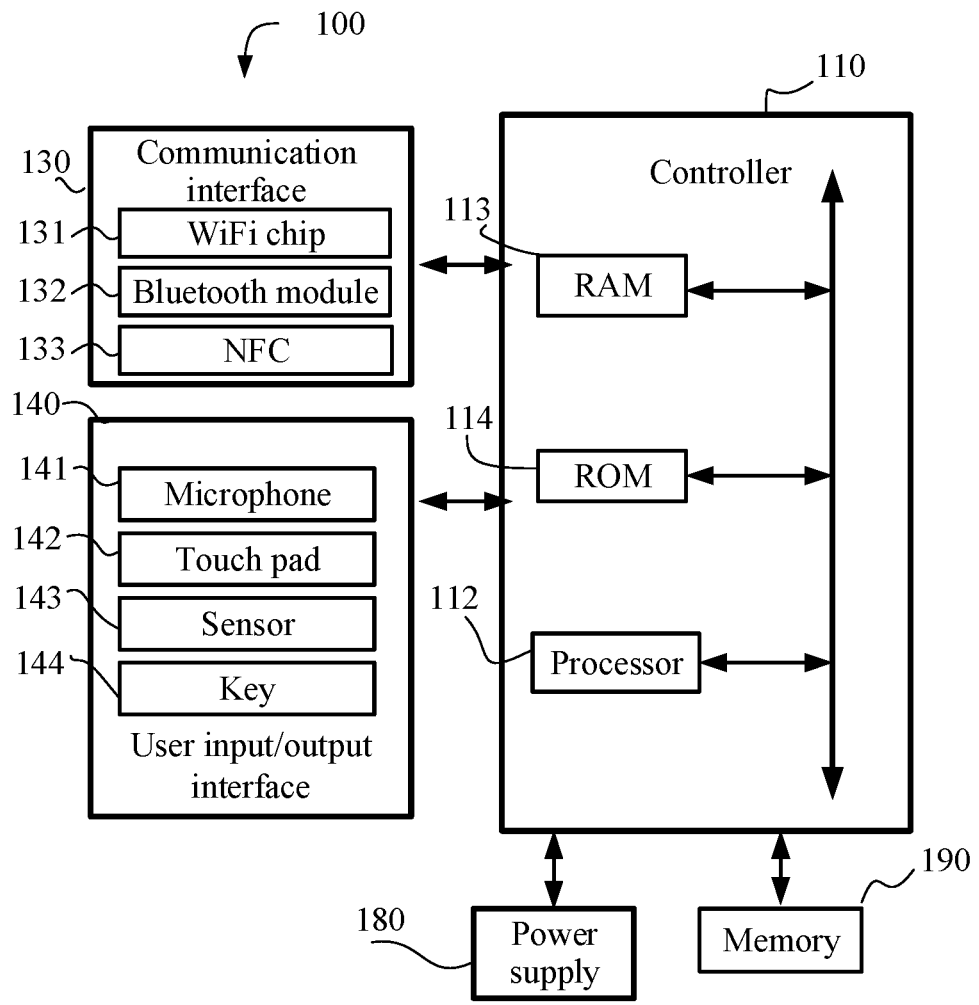
FIG. 2 shows a block diagram of a hardware configuration of the control device according to an embodiment of the disclosure.

FIG. 2 shows a block diagram of a hardware configuration of the control device 100 according to an exemplary embodiment.

In some embodiments, the control device 100 includes at least one of a controller 110, a communication interface 130, a user input/output interface 140, a power supply 180 and a memory 190.

Figure 3:
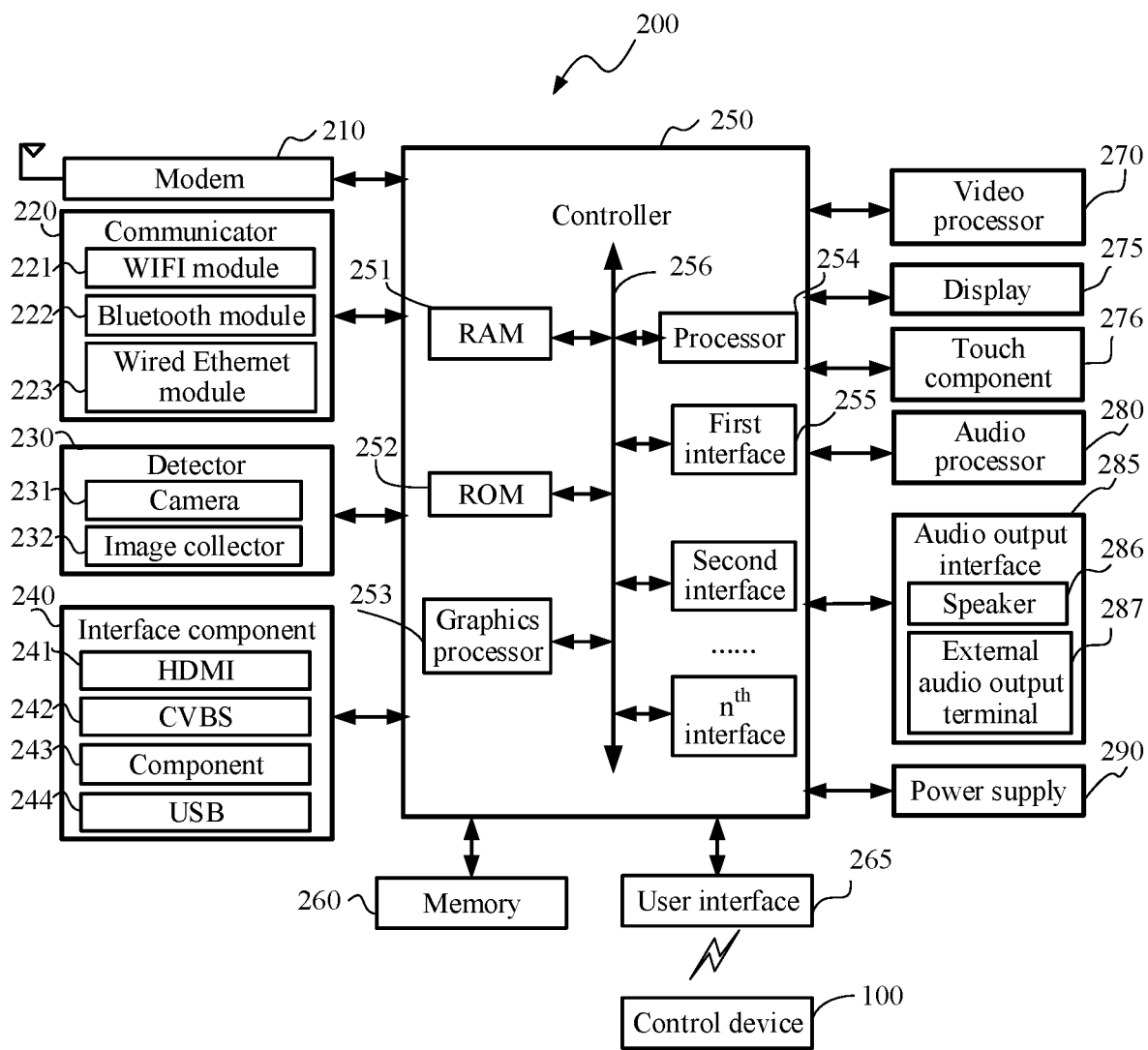
FIG. 3 shows a block diagram of a hardware configuration of the display apparatus according to an embodiment of the disclosure.

FIG. 3 shows a block diagram of a hardware configuration of the display apparatus 200 according to an exemplary embodiment.

In some embodiments, the display apparatus 200 includes at least one of a controller 250, a modem 210, a communicator 220, a detector 230, a display 275, an audio output interface 285, a memory 260, a power supply 290 and an interface component 240.

In some embodiments, the controller includes a processor, a video processor, an audio processor, a graphics processor, an RAM, an ROM, first to $n^{th}$ interfaces for input/output.

The display 275 includes: a panel component for presenting an image, a driver component for driving the image display, a component for receiving an image signal output from the controller to display the video content and image content as well as a menu control interface, and a UI interface for user's control operations, etc.

The display 275 may be a liquid crystal display, an OLED display or a projection display, and may also be a projection device and a projection screen.

In some embodiments, the communicator 220 is a component in communication with an external device or an external server according to various types of communication protocols. For example, the communicator may include at least one of a Wifi module, a Bluetooth module, a wired Ethernet module, other network communication protocol chip or near-field communication protocol chip, and an infrared receiver. The display apparatus 200 may establish sending and receiving of control signals and data signals with the control device 100 or the server 400 through the communicator 220.

The user input interface may be used to receive a control signal from the control device 100 (e.g., an infrared remote control, etc.).

The detector 230 is configured to collect external environment signals or signals for interacting with outside. For example, the detector 230 includes a light receiver, which is a sensor configured to collect the intensity of the ambient light; or the detector 230 includes an image collector, such as a camera, which may be configured to collect external environment scenes, user attributes or user interaction gestures; or the detector 230 includes a sound collector, such as a microphone, which is configured to receive external sounds.

The interface component 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port. The external device interface 240 may also be a composite input/output interface formed of a plurality of interfaces described above.

The modem 210 is configured to receive the broadcast television signals by a wired or wireless receiving method, and demodulates audio and video signals, such as EPG data signals, from a plurality of wireless or wired broadcast television signals.

In some embodiments, the controller 250 and the modem 210 may be located in separate devices, that is, the modem 210 may also be located in an external device (such as an external set-top box, etc.) of the main device where the controller 250 is located.

The controller 250 controls the operations of the display apparatus and responds to the user's operations through various software applications stored in the memory. The controller 250 controls the overall operation of the display apparatus 200. For example, in response to receiving a user command for selecting a UI object displayed on the display 275, the controller 250 may perform the operations related to the object selected by the user command.

In some embodiments, the controller includes at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc.

The user may input a user command on the Graphical User Interface (GUI) displayed on the display 275, and the user input interface receives the user input command through the Graphical User Interface (GUI). Alternatively, the user may input a user command by inputting a particular sound or gesture, and the user input interface recognizes the sound or gesture through the sensor to receive the user input command.

Figure 4:
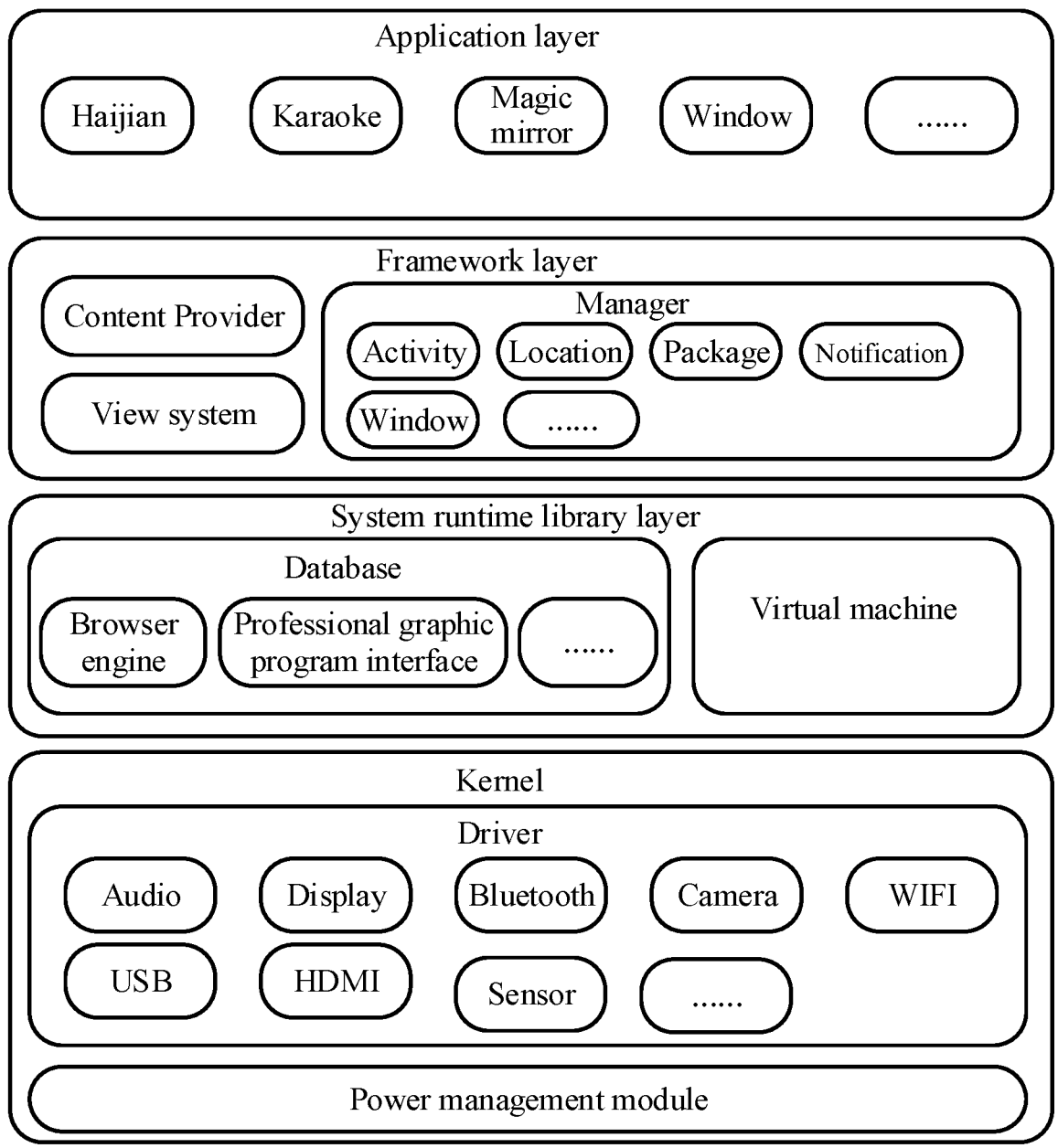
FIG. 4 shows a schematic diagram of a software configuration of the display apparatus according to an embodiment of the application.

As shown in FIG. 4, the application framework layer in embodiments of the disclosure includes a manager, a content provider, etc., and the manager includes at least one of: an Activity Manager used to interact with all activities running in the system. a Location Manager used to provide system services or applications with access to system location services, a Package Manager used to retrieve various information related to application packages currently installed on the device, a Notification Manager used to control the display and removal of notification messages, or a Window Manager used to manage icons, windows, toolbars, wallpapers and Desktop widget on the user interface.

The activity manager is used to manage a life cycle of an application and the general navigation function, such as exit (including: switching a user interface currently presented in the display window to a system desktop interface), launching, back (including: switching a user interface currently presented in the display window to a upper-level user interface of the currently presented user interface), etc. of the application.

The window manager is used to manage all the window applications, for example, obtain size of the display screen, determine whether there is a status bar, lock a screen, capture a screen, control update of the display window (for example, scaling a display window, dithering display, twist deformation display, etc.), etc.

The system runtime library layer provides support for the upper layer, for example, the framework layer. When the framework layer runs, the Android operating system will run the C/C++ library included in the system runtime library layer to implement the function(s) to be implemented by the framework layer.

The kernel layer is a layer between hardware and software. As shown in FIG. 4, the kernel layer includes at least one of: audio driver, display driver, Bluetooth driver, camera driver, WIFI driver, USB driver, HDMI driver, sensor driver (such as fingerprint sensor, temperature sensor, touch sensor, pressure sensor, etc.), etc.

In some embodiments, the software applications and/or modules corresponding to the software architecture in FIG. 4 are stored in the first memory or the second memory shown in FIG. 2 or FIG. 3.

In some embodiments, taking a magic mirror application (camera application) as an example, when a remote control receiving device receives an input operation from a remote control, a hardware interrupt is sent to the kernel layer. The kernel layer processes an input operation into an original input event (including the value of the input operation, the timestamp of the input operation and other information). The original input event is stored in the kernel layer. The application framework layer obtains the original input event from the kernel layer, identifies a control corresponding to the input event according to the current position of the focus, and identifies the input operation as a confirmation operation, where the control corresponding to the confirmation operation is the icon of the magic mirror application, the mirror application starts by calling the interface of the application framework layer, and then the camera driver starts by calling the kernel layer, to capture static images or videos via the camera.

In some embodiments, for a display apparatus with a touch function, taking a split view operation as an example, the display apparatus receives an input operation (such as a split view operation) from a user on the display screen, and the kernel layer can generate a corresponding input event according to the input operation and report the event to the application framework layer. The activity manager of the application framework layer sets the window mode (such as multi-window mode), window position and size, etc. corresponding to the input operation. The window manager of the application framework layer draws a window according to the settings of the activity manager and then sends the drawn window data to the display driver of the kernel layer, and the display driver presents corresponding application interfaces in different display areas of the display screen.

A smart display is a display product based on the Internet application technologies, and has an open operating system and a chip and an open application platform. Also, the smart display can be a television set with integrated audio/video function, entertainment function, and data communication function, and can realize human-machine interaction. In order to meet the various demands of users, various convenient functions are being developed, to improve the use experience of the smart display.

For example, the display apparatus is provided with an image collection device such as a camera, which is used to capture a user's image, and is in communication with a workout application in the display apparatus so that the display apparatus can display the user's image in real time. When the user's body moves, the application may display an updated image, and serve as a workout guide by detecting and correcting body movement through a detection program.

Figure 5:
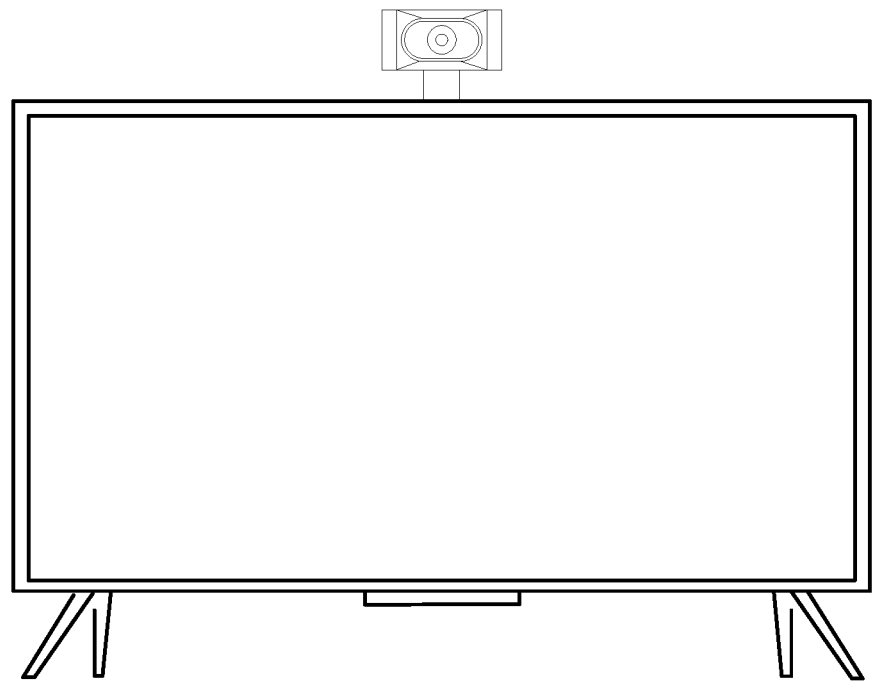
FIG. 5 shows a schematic diagram of an arrangement of a display apparatus and a camera according to an embodiment of the disclosure.

In embodiments of the disclosure, as shown in FIG. 5, the camera 231, as a detector 230, may be built in or connected with the display apparatus 200 via a port. After starting up and running, the camera 231 can detect image data. The camera 231 can be connected with the controller 250 through a port component, so as to send the detected image data to the controller 250 for processing.

In some embodiments, in order to detect images, the camera 231 may include a lens component and a pan-tilt component.

In some embodiments, the lens component may be an image capture element based on a CCD (Charge Coupled Device) or CMOS (Complementary Metal Oxide Semiconductor), so as to generate image data of electrical signals according to an image from a user. The lens component is mounted on the pan-tilt component, and the pan-tilt component can drive the lens component to rotate, so as to change the orientation of the lens component. The pan-tilt component may include at least two parts for rotation, to drive the lens component to rotate left and right and rotate up and down, respectively. Each part for rotation can be connected with a motor to perform automatic rotation through the motor.

Figure 6:
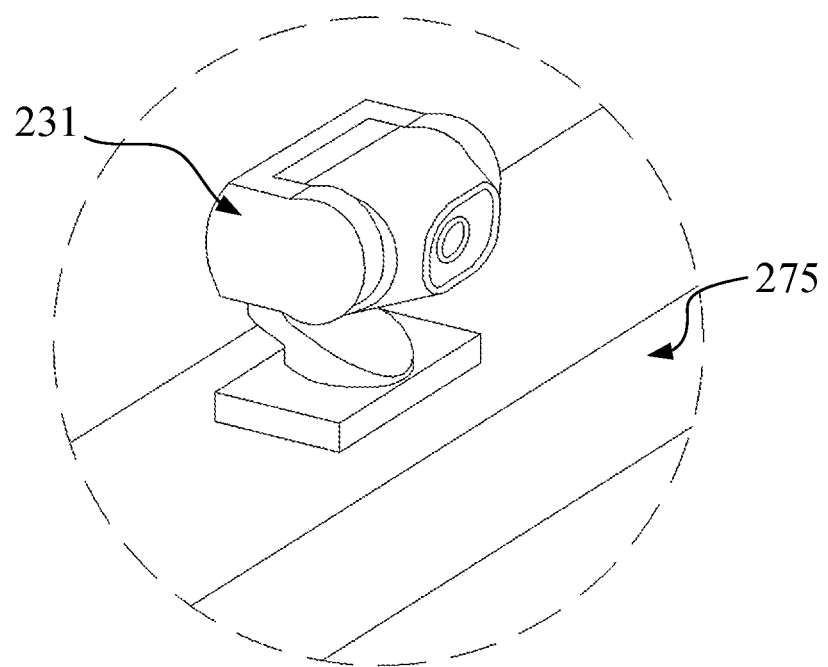
FIG. 6 shows a schematic structural diagram of a camera according to an embodiment of the disclosure.

For example, as shown in FIG. 6, the pan-tilt component may include a first rotating shaft in a vertical state and a second rotating shaft in a horizontal state, where the first rotating shaft is disposed on the top portion of the display 275 and is rotatably connected with the top portion of the display 275; the first rotating shaft is also provided with a fixing member, the top of the fixing member is rotatably connected with the second rotating shaft, and the second rotating shaft is connected with the lens component to drive the lens component to rotate. The first rotating shaft and the second rotating shaft are respectively connected with motors and drive components. The motor may be a servo motor, a stepping motor, etc. that can support automatic control of the rotation to an angle. Upon obtaining a control instruction, two motors can be rotated respectively to drive the first rotating shaft and the second rotating shaft to rotate, so as to adjust the orientation of the lens component.

With different orientations of the lens component, the lens component can capture a video from users at different positions, so as to obtain user's image data. Obviously, different orientations correspond to image capture in different areas. When a user is at left front of the display 275, the first rotating shaft on the pan-tilt component can drive the fixing member and the lens component to rotate in a corresponding direction, so that the user portrait is located in an area within the image presented on the display during image capturing; when the imaging position of the user's body is lower, the second rotating shaft in the pan-tilt component can drive the lens component to rotate upward to raise the shooting angle, to cause the user portrait to be in the center area of the image.

Based on the above-mentioned camera 231, the controller 250 can identify a portrait region in the image by analyzing the image content collected by the camera 231, and determine the user's position according to the portrait region. The rotation of the camera 231 can be adjusted according to user's position, so that the portrait in the image captured by the camera 231 is always located in an appropriate area, realizing tracking of objects by the camera 231.

In some embodiments, since the position of the display apparatus in the room is relatively fixed and the comfortable viewing distance for the user is relatively far from the display apparatus. In a scenario that two or more people are in video chat, a peer user, especially the face of the peer user, only occupies a small part of the whole image collected by a peer device, so that the peer user and the face presented on the local device to the local user are relatively small. In addition, the viewing distance between the local user and the display apparatus is relatively large, so that the peer user and the face actually viewed by the local user are smaller. In multi-party chatting scenario, multiple video windows are presented on the local screen simultaneously, so that the object in each video window is further scaled down, leading to poor user experience during video chat. Furthermore, when a peer user moves to a farther location, the above issue will become worse.

In view of the above issues, an embodiment of the disclosure provides a display apparatus that can crop an image captured by the camera according to an object's position and output a cropped image on the display.

The display apparatus includes: a display configured to present an image from broadcast system or Internet and/or a user interface; a camera 231 configured to collect an image with a first aspect ratio; a controller 250 in communication with the display and the camera, which is able to receive a control signal for indicating turning on or turning off the camera. The controller is configured to: in response to a control signal for turning on the camera, receive image input from the camera 231; adjust a position of a crop frame of an image according to a position of a target object in the image from the image data to determine an adjusted crop frame, and output an adjusted image based on the adjusted crop frame to the display 275, where the adjusted image corresponds to image data from an area of the adjusted crop frame in the image, the crop frame has a second aspect ratio different from the first aspect ratio.

In some embodiments, the position of the target object is obtained according to user's selection. The display 275 is used to display an initial image from the image data and a crop frame in the initial image, where the position of the crop frame is presented at the center of the display in the initial state where the initial image is being displayed; and the display 275 is configured to present an image interface for the initial image, and a user interface with a selector, where the selector on the user interface is configured to indicate that an item on the user interface is selected.

The controller 250 is configured to automatically determine position of a target object. In an embodiment of the disclosure, the controller 250 can obtain the position of the target object through face recognition technology. In some embodiments, the position information of the face feature points can be used to locate a face in the face detection, verify the result of the face detection, and identify the face position accurately.

In some embodiments of the disclosure, ASM (Active Shape Model) method may be used, or AAM (Active Appearance Model) method may be used. The center point of the face area is the position of the target object.

In some embodiments, the adjustment process of the crop frame includes: firstly determining whether the center position of the crop frame is consistent with the position of the target object in the initial state; in response to being consistent, there is no need to adjust the position of the crop frame; in response to being not consistent, the position of the crop frame is adjusted according to the position of the target object.

If the distance between the position where the person locates and the camera is within a certain range, such as a range in which the image can be captured, the camera is not controlled to rotate. That is to say, only the relative position of the crop frame in the captured image under the fixed camera position is adjusted. When it is detected that the distance exceeds this range due to the user's movement during the image capture, the camera needs to be driven by the pan-tilt component to rotate to realize tracking of the object's motion.

Figure 7:
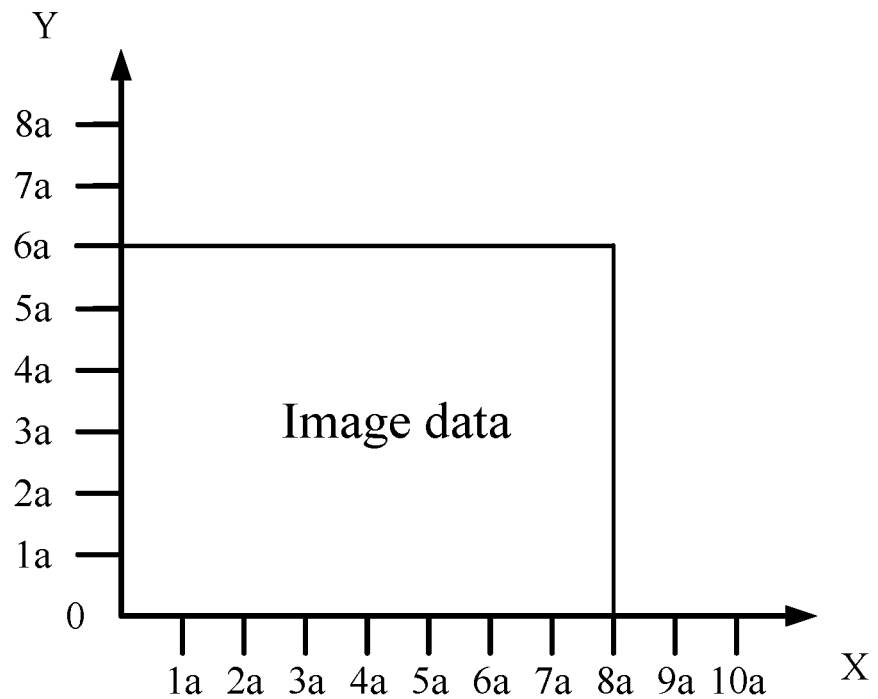
FIG. 7 shows a coordinate axis constructed according to an embodiment of the disclosure.

In the embodiments of the disclosure, the coordinate axes are established at first. The coordinate axes take the lower left corner of the image as the origin, the extension line in the height direction of the image is Y axis, and the extension line in the width direction of the image data is X axis, referring to FIG. 7 for details. It can be seen that the Y axis among the coordinate axes is the extension line in the height direction of the image data, and the X axis among the coordinate axes is the extension line in the width direction of the image data.

In order to facilitate the calculation, the embodiments of the disclosure may use the origin (0, 0) of the coordinate axes as the coordinate of the lower left corner of the crop frame in the initial state.

In some embodiments, while the camera 231 of the display apparatus is used to capture a user's image, the user is likely to face the center of the camera 231. In this case, a display image suitable for the display is cut out at the center location of the image, thereby ensuring that a human face in the display image occupies a relative large portion of the image.

In order to meet the above requirement, in the embodiments of the disclosure, the coordinate of the lower left corner of the crop frame are (x, y) in the initial state, and the coordinate of the lower left corner of the crop frame are also referred to as coordinate of a starting point in the disclosure;

$$X=(Wc-Wt)/2; \text{ and } Y=(Hc-Ht)/2;$$

where Wc is the width of the image, and Hc is the height of the image; and

Wt is the width of the crop frame that corresponds to or is consistent with a pixel number along the width of the display resolution, and Ht is the height of the crop frame that is consistent or corresponds to a pixel number along the height of the display resolution.

Figure 8:
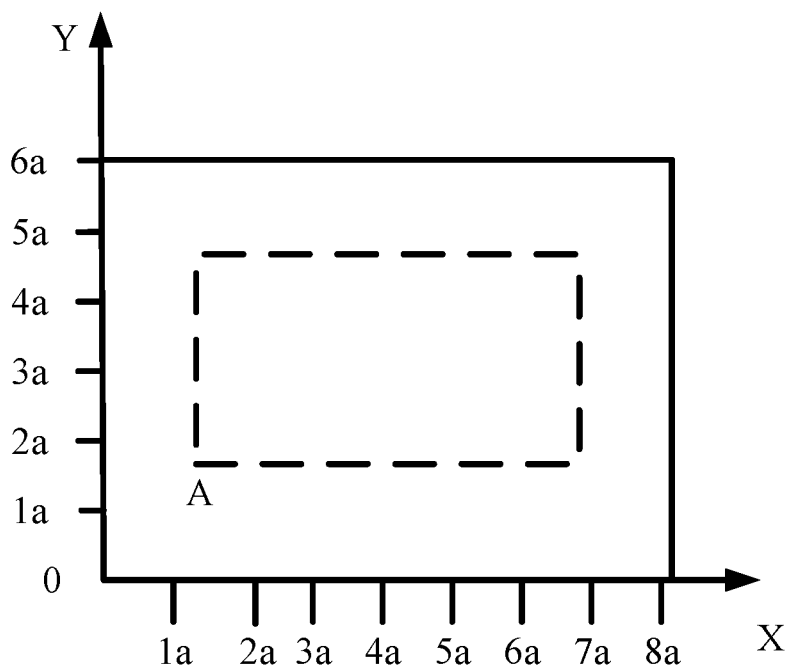
FIG. 8 shows a schematic diagram for illustrating relative positions of the image and the crop frame.

In some embodiments, referring to FIG. 8, the outer rectangle in the figure represents the image, the width of the image denotes as Wc, the height of the image denotes as Hc, the inner rectangle in the figure represents the crop frame, the width of the crop frame denotes as Wt, and the height of the crop frame denotes as Ht.

The coordinate of the lower left corner of the crop frame in the initial state is (X, Y), where X=(Wc−Wt)/2 and Y=(Hc−Ht)/2, so that the human face in the display image occupies a relatively large proportion of the entire image.

In the embodiments of the disclosure, it is determined whether the position of the crop frame needs to be moved by determining whether the coordinate (second center coordinate) of the target object is consistent with the center coordinate (first center coordinate) of the crop frame.

Figure 9:
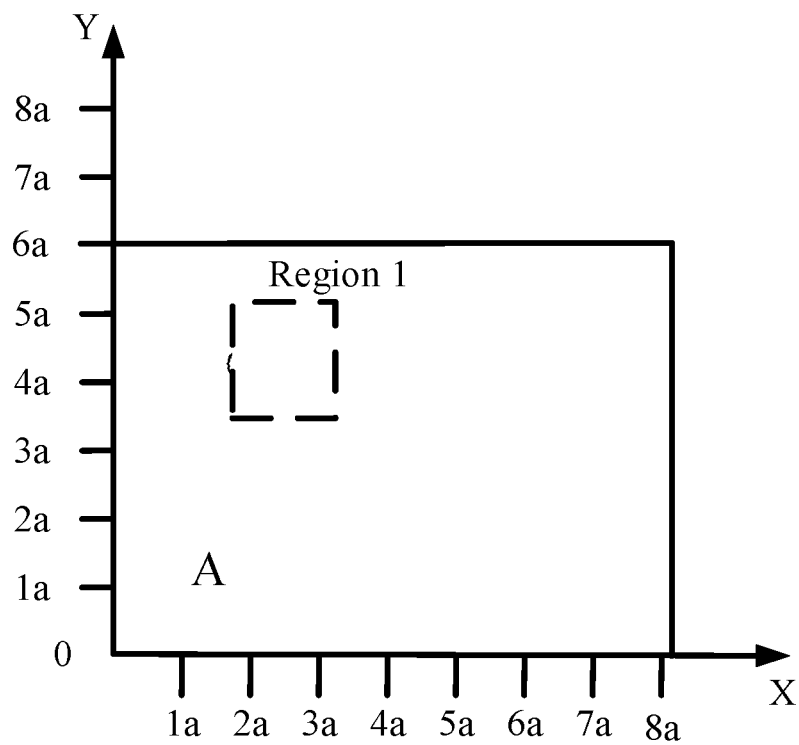
FIG. 9 shows a schematic diagram of face location.

In some embodiments, the controller 250 obtains the second center coordinate at first. The second center coordinate may be obtained according to the user's selection, or may be obtained automatically by the controller 250. If the controller 250 obtains the second center coordinate automatically, referring to FIG. 9, the region with the face is denoted as region 1, then the center of the region 1 is the second center point.

Then, the image processor 303 determines whether the second center coordinate overlaps with the first center coordinate. In response to the second center coordinate overlapping with the first center coordinate, the image data corresponding to the region of the crop frame may be output to the display 275. Otherwise, the position of the crop frame is adjusted according to the second center coordinate, and the adjusted image is output to the display 275, where the adjusted image corresponds to the image data in the region of the adjusted crop frame.

In some embodiments, the controller may directly present the image captured by the camera on the display without processing the proportion of the object region in the image captured by the camera. Alternatively, the camera can zoom in a target individual by adjusting the focal length automatically.

In other embodiments, when there are a plurality of persons in the current scenario, the image captured by the camera 231 may include a plurality of portrait regions, so that the controller 250 cannot calculate the rotation angle of the camera 231 according to the positions of the plurality of portrait regions. For example, the camera captures two persons of which one is moving to the left and the other is moving to the right, and the camera cannot determine whether to turn left or right and cannot track the two persons simultaneously.

In order to track at least one person, any portrait region may also be locked, so that the controller 250 controls the camera 231 to rotate according to the locked portrait region. However, in some scenarios, starting the camera 231 by an application aims to obtain an image of a multi-person image, and the image obtained in the locking manner may be not the type of image that the application expects to obtain. For example, the locked person moves to an area outside the crowd, and the camera 231 also follows to shoot the area outside the crowd. The image captured at this time is not of the multi-person scenario.

In order to adapt to the multi-person scenario, some embodiments of the disclosure further provide a camera tracking method, including the following process.

A reference image captured by the camera is obtained.

After the camera 231 starts to work, the controller 250 may obtain the reference image through the camera 231. The reference image is an image of a current scenario captured by the camera 231. Obviously, when the current scenario is a multi-person scenario, the reference image captured by the camera 231 should include a plurality of portraits.

Here, the camera 231 may starts in a manual mode or an automatic mode. In the manual mode, the camera starts in response to a selection of an icon corresponding to the camera 231 on the operation interface through a control device 100 such as the remote control. In the automatic mode, the camera 231 starts automatically in response to an interactive operation that requires invoking the camera 231. For example, when the user selects the application "Mirror" in the "My Application" interface. Since this application needs to invoke the camera 231, the camera 231 also starts to work when this application starts to run.

A face region is identified in the reference image.

After obtaining the reference image captured by the camera 231, the controller 250 can identify the face region in the reference image through an image analysis program such as a program based on AI algorithm, and the identification manner may be set according to specific scenarios and features of the captured reference image.

In some embodiments, firstly the key points similar in shape to the face organs in the reference image are obtained through pattern matching, where the key points similar in shape to the face organs refer to key points whose enclosed shape with a similarity to a shape of a face organ being greater than a set threshold; then a set of key points is generated according to classification of key points whose distances meet a recognition range; then the coordinates of key points at boundary positions in the set of key points are obtained; and thus a face region is determined according to the coordinates of the key points at the boundary positions.

For example, the content similar in shape to the face organs may be obtained by means of pattern matching in the reference image and marked as key points. A plurality of key points from the face organs are determined through pattern matching on multiple areas, so as to determine the position of the whole face region.

Figure 10:
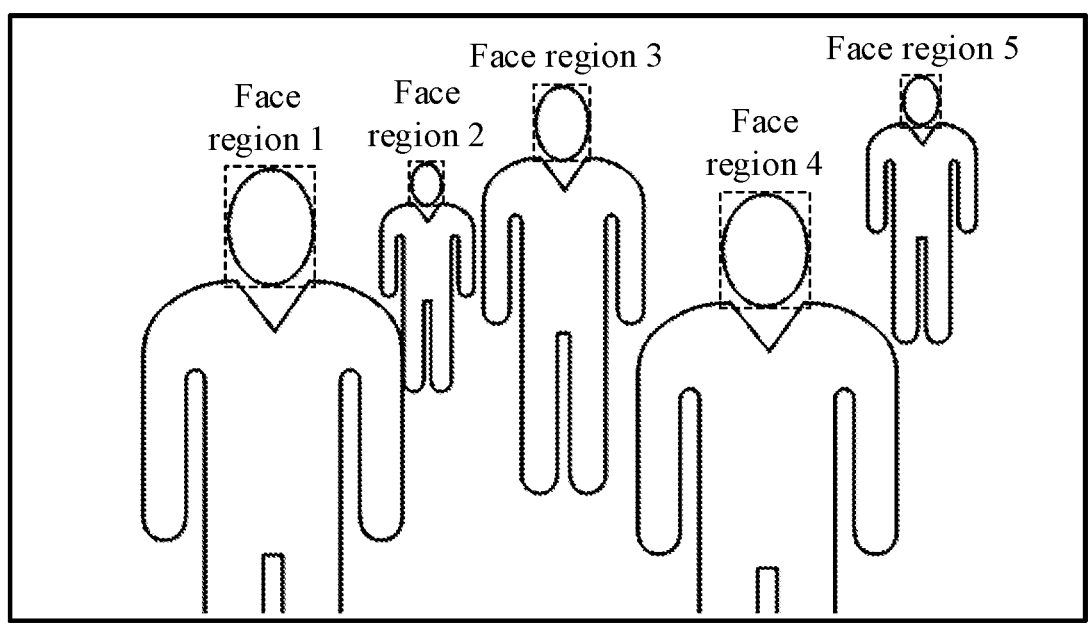
FIG. 10 shows a schematic diagram of identifying a plurality of face regions according to an embodiment of the disclosure.

After the face region is identified, a plurality of regions may be marked by region division. For example, an identified face region is marked with the distance between two identified ear points as the width and the distance between the forehead point and the chin point as the height. Furthermore, in some scenarios, the face region can also be displayed on the user interface in real time. For example, as shown in FIG. 10, the identified face region may be displayed with a frame.

Obviously, there may also be other ways to identify the face region. For example, the reference image can be divided into a plurality of detection partitions according to a set sampling rate, HASH value of the pixel number in each partition is calculated separately, and then the calculated HASH value is compared with the sample HASH value of a preset face pattern. When the difference between the calculated HASH value and the sample HASH value is within a reasonable range, it is determined that the corresponding detection partition contains a face pattern. When faces have different sizes, a plurality of detection partitions can be spliced, so as to determine the position of a whole face region.

The current imaging parameter(s) of the camera 231 is obtained, and a target distance corresponding to each face region in the reference image is calculated according to the imaging parameter(s).

After identifying the face region in the detected image, the controller 250 can also calculate the distance between a first person corresponding to a first face region and the lens component of the camera 231 according to the size of the first face region and the imaging parameter(s) such as the focal length of lens component of the camera 231 and the distance between specific key points in the portrait, where the focal length refers to the distance between the center of the lens to the focal point. Since the imaging parameters such as the focal length of the lens component of the camera 231 always change, the current imaging parameter may be obtained through the camera 231 when the target distance is calculated.

Figure 11:
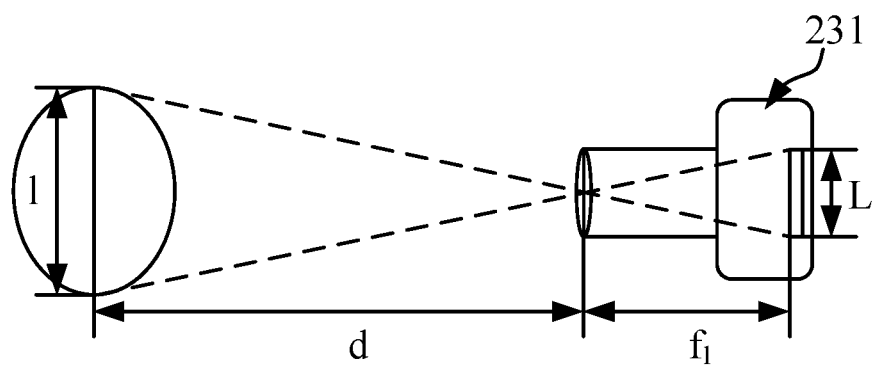
FIG. 11 shows a schematic diagram of calculating a target distance according to an embodiment of the disclosure.

As shown in FIG. 11, by obtaining the current focal length of the lens component of the camera 231, the distance between the object in the capture area and the lens component can be derived according to the following formula through the length of a certain part of the object:

$$d = f \times L / 1$$

where, d is the distance between the object in the capture area and the lens component; $f_1$ is the current focal length of the lens component; L is the length of the object; 1 is the size of the image of the object.

In order to calculate the distance between an individual and the lens component, the length of the object in the above formula can be calculated by the distance between two specific organs in the face of this individual. For example, the width of an individual's head (or canthus), regardless of race, gender, height and other factors, varies slightly. Therefore, the canthus width can be used as the known length of the object on the human body, meanwhile, the value of the length of the object can be adjusted based on age and gender information, to improve the accuracy of the calculation.

The size of the image of the object can be represented by the size of the pattern in the captured image. For example, the imaging width of the canthus of a human face can be calculated from the resolution of the image captured by the camera and the number of pixels of the canthus width in the captured image.

In some embodiments, when the target distance corresponding to each face region is calculated according to the imaging parameter(s), auxiliary information such as age and gender corresponding to each identified face region may also be determined through an image recognition algorithm. In some embodiments, the image content corresponding to the face region is input into an AI model with AI recognition function, so as to obtain an input result through the AI model and determine the information such as age and gender corresponding to the portrait region.

After determining the auxiliary information, the controller 250 may further call the database and match the face size range based on the information such as age and gender from the database, so as to determine a more accurate length of the object in the capture area, to facilitate the calculation of the target distance corresponding to the face region. Here, the database invoked by the controller 250 may be a data table including statistical data, and the database may be pre-stored in the display apparatus 200 or the server 400 and invoked when the controller 250 performs calculating the target distance corresponding to each face region according to the imaging parameter(s).

The target area is extracted or tracked.

Figure 12A:
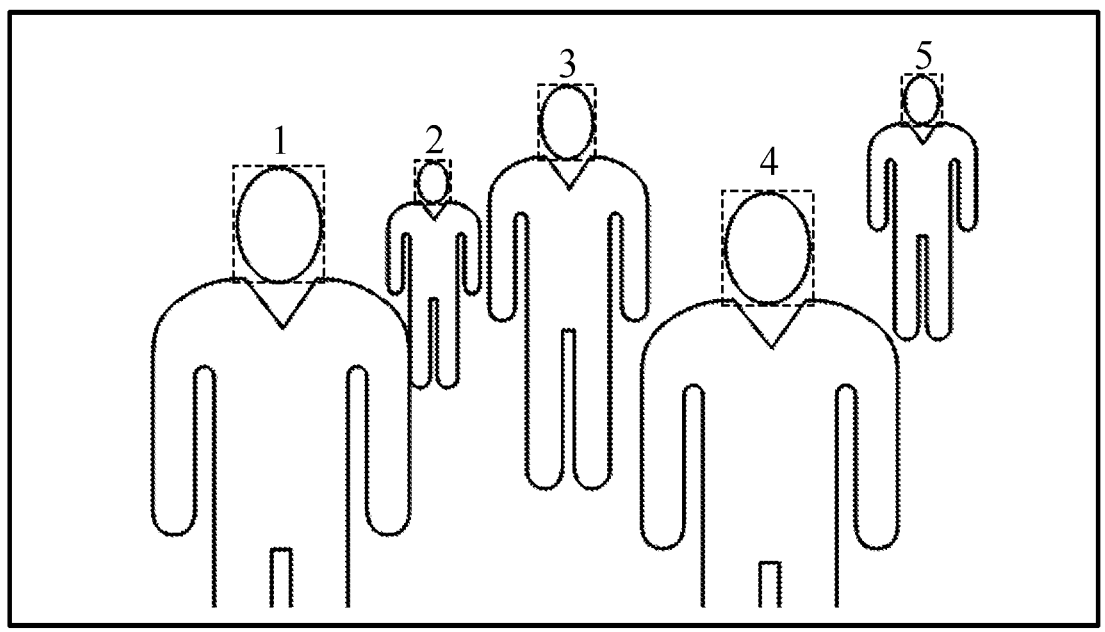
FIG. 12A shows a first schematic diagram for illustrating a result of face region recognition according to an embodiment of the disclosure.
Figure 12B:
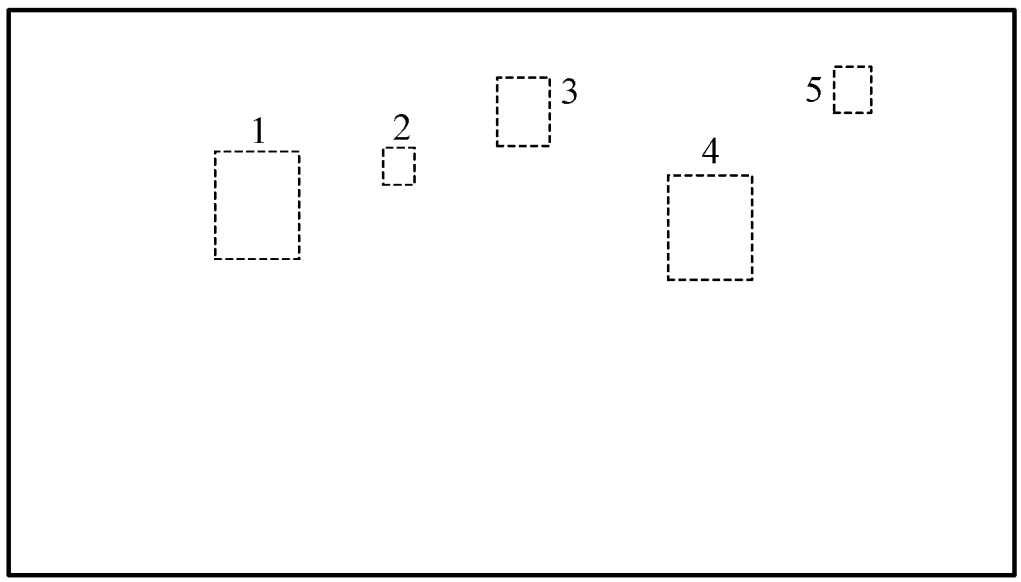
FIG. 12B shows a second schematic diagram for illustrating a result of face region recognition according to an embodiment of the disclosure.

As shown in FIG. 12A and FIG. 12B, the target area includes at least one face region, and may be a large region including a plurality of face regions.

Figure 12C:
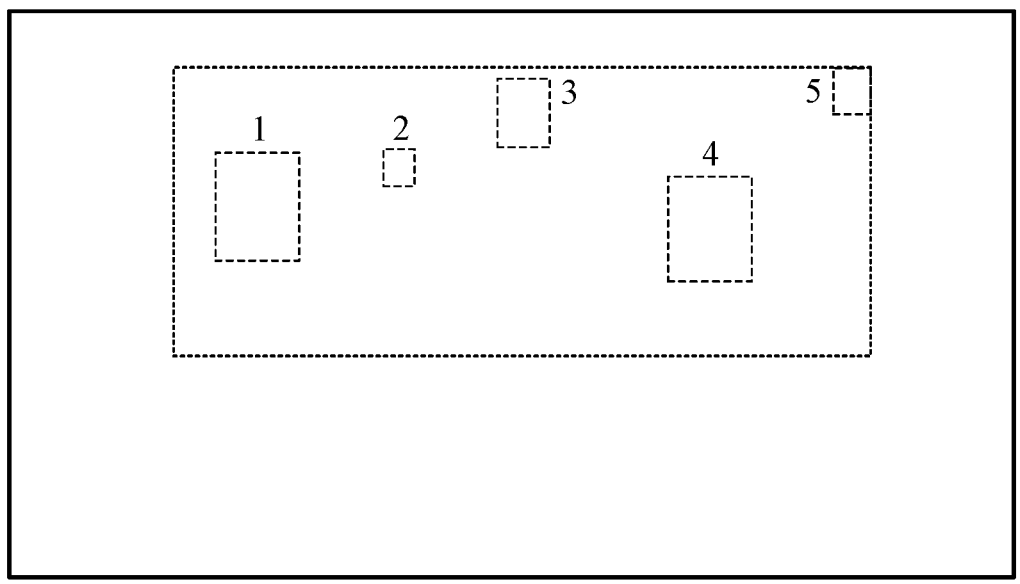
FIG. 12C shows a schematic diagram for illustrating a result of determining a tracking target area according to an embodiment of the disclosure.

As shown in FIG. 12C, the tracking target area is compared with a preset area in the reference image, so as to determine whether the current position(s) of user(s) are in the preset area.

A point for representing the positions of users may be determined in the tracking target area, for example, the center position of the tracking target area may be extracted to represent the location of the tracking target area. For example, the center position of the tracking target area is calculated by obtaining the x-axis position coordinates (x1 and x2) of the left and right boundaries of the tracking target area, that is, the x-axis coordinate of the center position is $x_0=(x_1+x_2)/2$.

Since the camera 231 in embodiments of the disclosure may include two rotations in the left-right direction and the up-down direction respectively, the x-axis coordinate may be firstly determined after calculating the x-axis coordinate of the center position, to determine whether the x-axis coordinate of the center position is at the center of the entire image. For example, when the reference image is a 1080P image (1920, 1080), the horizontal coordinate of the center point of the reference image is 960.

Figure 12D:
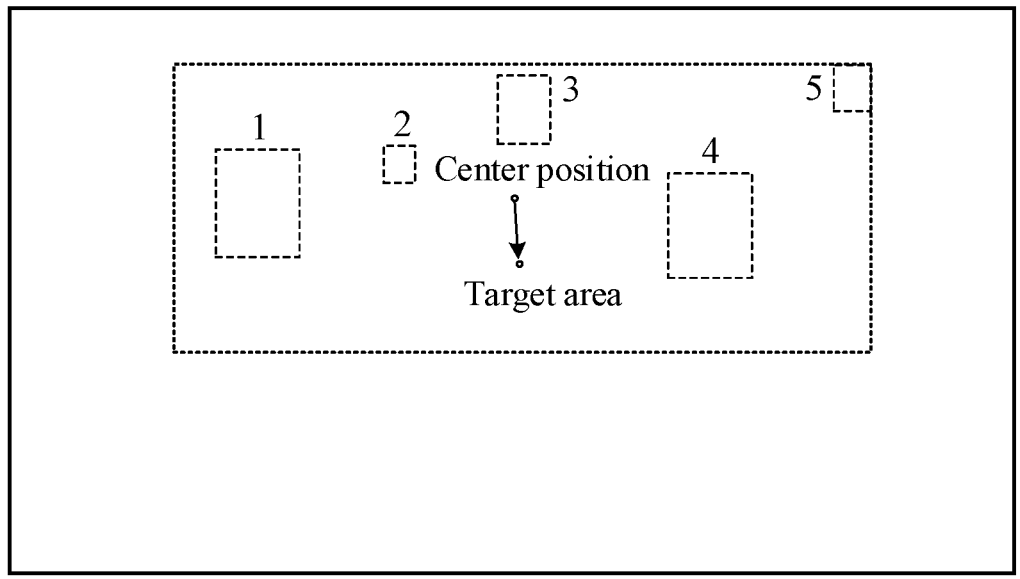
FIG. 12D shows a schematic diagram of comparing the tracking target area with a preset area according to an embodiment of the disclosure.

As shown in FIG. 12D, after determining the center position of the tracking target area and the center point of the image, it can be determined whether the tracking target area is located in the preset area by comparing the coordinate value of the center position of the tracking target area and the coordinate value of the center point of the image. In order to avoid increasing processing load caused by frequent adjustments and to tolerate partial detection errors, based on the requirements of actual needs and the viewing angle of the camera 231 in the horizontal direction, a tolerance coordinate range may be preset. When the center position of the target area is within the tolerance coordinate range, it is determined that the current tracking target area is within the preset area.

For example, the maximum tolerance coordinate error is 100 pixels, and then the tolerance coordinate interval is [860, 1060]. When the coordinate of the center position of the tracking target area obtained by detection is within this interval, it is determined that the tracking target area is in the preset area, that is, the coordinate of the center position of the tracking target area obtained by calculation are not much different from the coordinate 960; when the coordinate of the center position of the tracking target area obtained by detection is not within this interval, it is determined that the current tracking target area is not in the preset area, that is, the coordinate of the center position of the tracking target area obtained by calculation is quite different from the coordinate 960.

After comparing the tracking target area with the preset area in the reference image, it can be determined whether portrait tracking is required according to the comparison result. If the center position of the current tracking target area is not within the preset area, the camera 231 is controlled to rotate so that the imaging positions of the users are located in the middle area of the image. If the center position of the current tracking target area is within the preset area, there is no need to control the camera 231 to rotate, and the image acquisition requirement can be met by maintaining the current orientation of the camera.

When the center position of the current tracking target area is not within the preset area, in order to control the camera 231 to rotate, the controller 250 may calculate the amount of rotation angle according to the user position, and generate a control instruction according to the amount of rotation angle to control the camera 231 to rotate.

In some embodiments, after determining that the center position of the current tracking target area is not within the preset area, the controller 250 may firstly calculate the distance between the center position of the tracking target area and the center point of the image area; then calculate the rotation angle according to the calculated distance combined with the maximum angle of view of the lens component of the camera 231 and the image size; and finally send the calculated rotation angle to the camera 231 in the form of a control instruction, so that the motor in the camera 231 drives each rotating shaft to rotate, thereby adjusting the orientation of the lens component.

In some embodiments, since the image detection supports multi-object recognition, it is always trying to include multiple detected persons as possible in the multi-object scenario. However, in the complex environment, such as exhibition, supermarket and multi-person home environment, the camera captures multiple persons, where many persons who do not pay attention to the apparatus walk around behind the apparatus, and only those who stand in front of the camera with relatively large faces that are captured are persons who actually pay attention to the apparatus. And, there are persons who move fast and frequently in front of the camera, and there is a problem that some people cannot be focused on because of frequent adjustments of the camera due to motions of other people.

Therefore, it is also necessary to remove persons whose faces are too small or persons who move fast and frequently from the multiple persons from the captured image, so as to obtain a relatively stable image.

In some embodiments, when extracting the target area, a weight is set for each face region according to the area of the face region and the target distance.

A plurality of face regions detected may be sorted according to the sizes of the regions, and the weights are set according to the sorting result. The weights configured may be calculated according to the area of the face regions and the target distance in combination or individually. Generally, the weight of a face region with a larger area in the captured image may be configured with a higher value according to the requirement of the application invoking the camera 231. Likewise, the face regions may be sorted from near to far according to the calculated target distances. Obviously, the closer the distance, the greater the weight.

The weights may be configured by pre-setting a plurality of area and distance intervals, where each interval corresponds to a weight. For example, the corresponding relationship between area interval and distance interval and weight may be as shown in the following table I.

TABLE I

| Area Interval | Weight 1 | Distance Interval | Weight 2 |
|---|---|---|---|
| 0-20000px | 0.05 | 0-1 m | 0.5 |
| 20000-40000 | 0.1 | 1-2 m | 0.4 |
| ... | ... | ... | ... |

After obtaining the area of the face region and the target distance through calculation, the area of the face region is compared with the area intervals respectively, and the target distance is compared with the distance intervals respectively, thereby determining the intervals to which the area of the face region and the target distance belong, to determine the weight. For example, when the number of pixels occupied by the face region is 30000 px and the calculated distance value is 1.5 m, the weight 1 and weight 2 corresponding to the current face region are determined to be 0.1 and 0.4, and the total weight value of the current face region may be calculated as 0.1+0.4=0.5 through the weight 1 and weight 2.

Obviously, the weights may be set to different values according to different scenarios. Also, according to actual processing needs, the weight corresponding to the area of the face region and the weight corresponding to the target distance may be weighted and summed to obtain a compound weight.

The tracking target area is extracted according to the weight of each face region.

Here, the tracking target area includes at least one face region, and may be a large region including a plurality of face regions. In order to extract the tracking target area, a weight threshold may be set, and the weight corresponding to each face region is compared with the weight threshold. In response to the weight corresponding to a first face region being greater than or equal to the weight threshold, the first face region is retained; in response to the weight corresponding to a second face region being less than the weight threshold, the second face region is deleted.

By traversing the weights corresponding to all the identified face regions and performing determinations, the face regions with weights greater than or equal to the weight threshold are retained, that is, the face regions with larger areas or closer target distances are retained. The face regions with smaller areas or farther target distances are deleted. Then, according to the positions of the remaining face regions, a preset shape range that encloses the remaining face regions is determined to form a tracking target area.

Figure 13A:
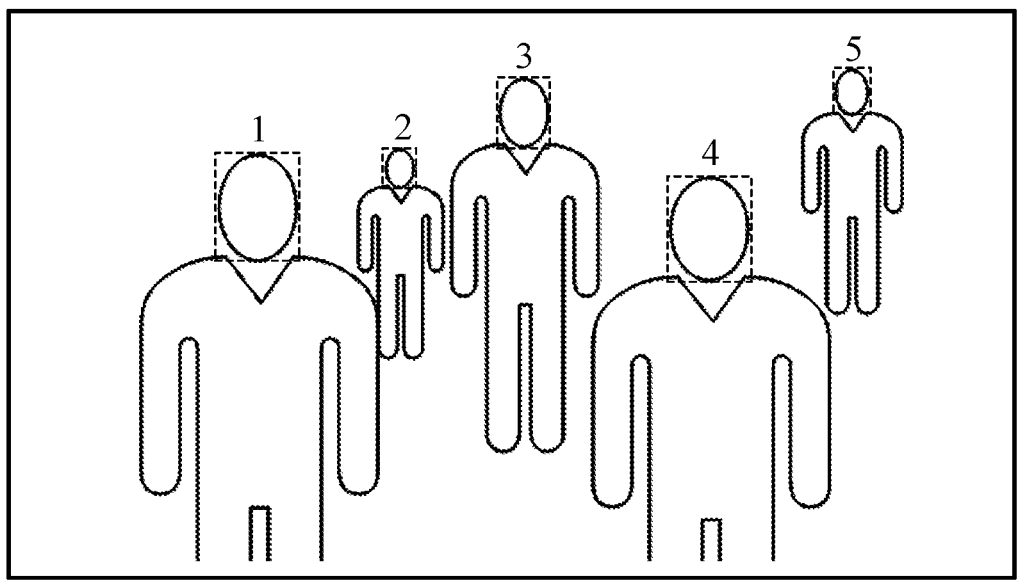
FIG. 13A shows a schematic diagram of a result of face region recognition according to an embodiment of the disclosure.
Figure 13B:
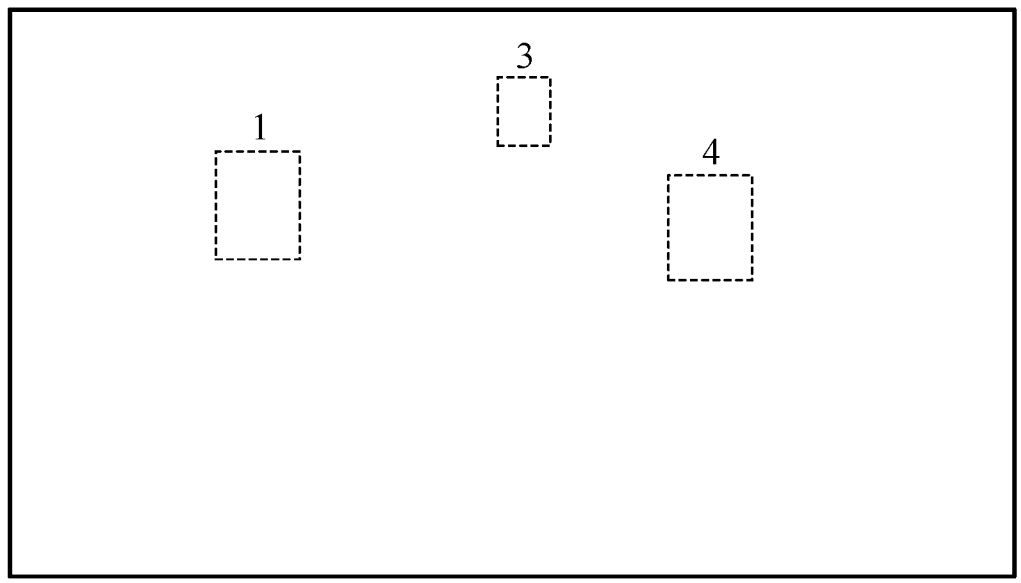
FIG. 13B shows a schematic diagram of a result of screening face regions based on weights according to an embodiment of the disclosure.
Figure 13C:
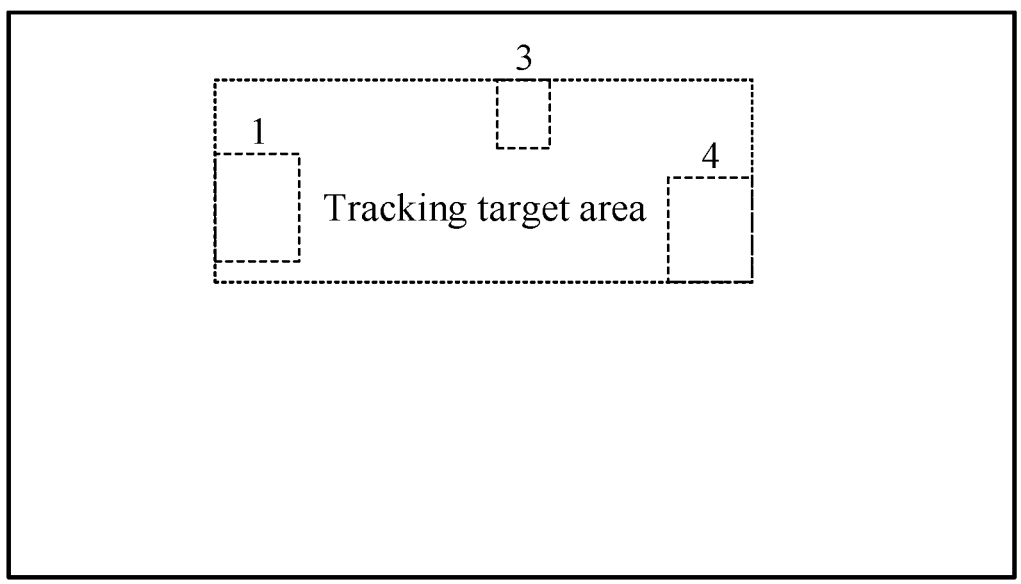
FIG. 13C shows a schematic diagram of a result of determining a tracking target area according to an embodiment of the disclosure.

For example, as shown in FIG. 13A, the recognition program identifies a reference image including five face regions, and the weights of the face regions are obtained as W1, W2, W3, W4 and W5 respectively by weight calculation. By comparison with the weight threshold Wt, it is determined that W1≥Wt, W3≥Wt and W4≥Wt; while W2<Wt and W5<Wt. That is, the face region 1, face region 3 and face region 4 are retained, and the face region 2 and face region 5 are deleted, as shown in FIG. 13B. After the face region 2 and the face region 5 are deleted, the face region 1, the face region 3 and the face region 4 are enclosed inside a rectangular by traversing the boundary regions of the face region 1, the face region 3 and the face region 4, to thereby form the tracking target area, as shown in FIG. 13C.

The tracking target area is compared with a preset area in the reference image, so as to determine whether the current positions of users are in the preset area.

A point for characterizing the positions of users may be determined in the tracking target area, for example, the center position of the tracking target area may be extracted to represent the location of the tracking target area. For example, the center position of the tracking target area is calculated by obtaining the x-axis position coordinates ($x_1$ and $x_2$) of the left and right boundaries of the tracking target area, that is, the x-axis coordinate of the center position is $x_0=(x_1+x_2)/2$.

Since the camera 231 in the embodiments of the disclosure may include two rotations in the left-right direction and the up-down direction, the x-axis coordinate may be firstly determined after calculating the x-axis coordinate of the center position, to determine whether the x-axis coordinate of the center position is at the center of the entire image. For example, when the reference image is a 1080P image (1920, 1080), the horizontal coordinate of the center point of the reference image is 960.

Figure 13D:
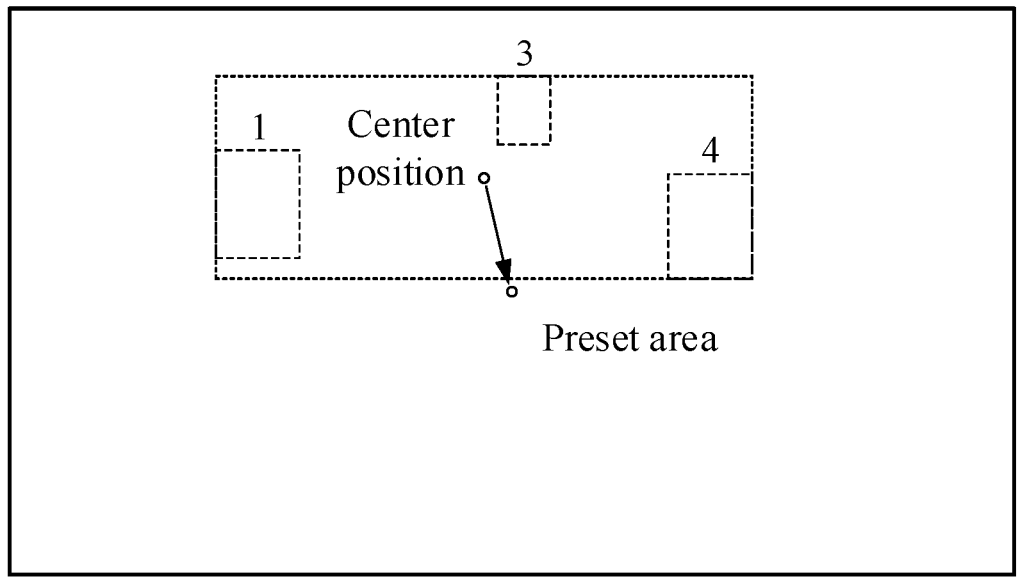
FIG. 13D shows a schematic diagram of comparing the tracking target area with a preset area according to an embodiment of the disclosure.

As shown in FIG. 13D, after determining the center position of the tracking target area and the center point of the image, it can be determined whether the tracking target area is located in the preset area by comparing the values of the center position and the center point of the image. In order to avoid increasing processing load caused by frequent adjustments and to allow for partial detection errors, according to actual needs and the viewing angle of the camera 231 in the horizontal direction, a tolerance coordinate range may be preset. When the center position of the target area is within the tolerance coordinate range, it is determined that the current tracking target area is within the preset area.

For example, the maximum tolerance coordinate error is 100 pixels, and then the tolerance coordinate interval is [860, 1060]. When the coordinate of the center position of the tracking target area obtained by detection are within this interval, it is determined that the tracking target area is in the preset area, that is, the coordinate of the center position of the tracking target area obtained by calculation is not much different from the position 960; when the coordinate of the center position of the tracking target area obtained by detection is not within this interval, it is determined that the current tracking target area is not in the preset area, that is, the coordinate of the center position of the tracking target area obtained by calculation is quite different from the position 960.

Figure 13E:
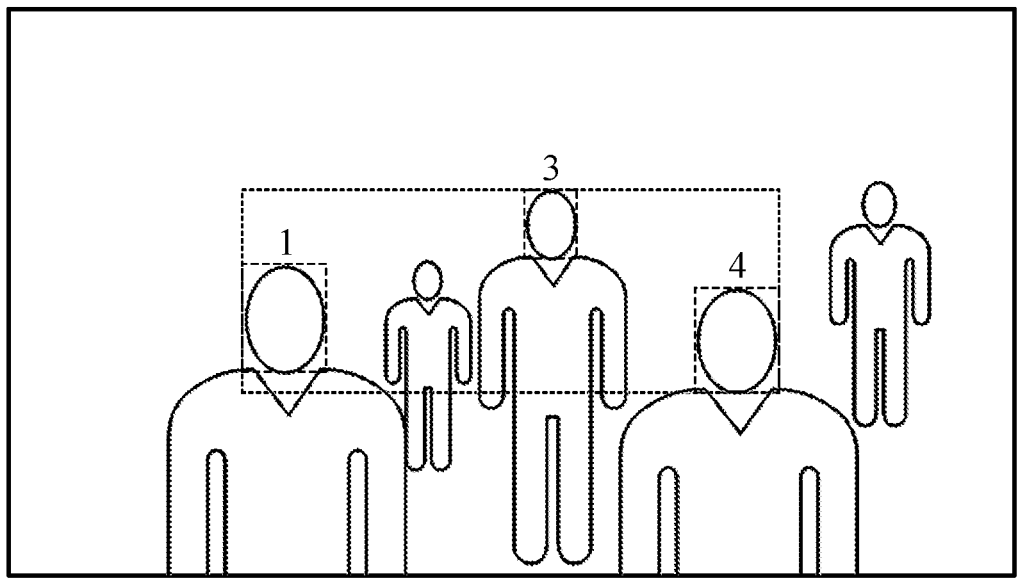
FIG. 13E shows a schematic diagram of a camera adjustment result according to an embodiment of the disclosure.

After comparing the tracking target area with the preset area in the reference image, it can be determined whether portrait tracking is required according to the comparison result. If the center position of the current tracking target area is not within the preset area, the camera 231 is controlled to rotate so that the imaging positions of the users are located in the middle area of the image, as shown in FIG. 13E. If the center position of the current tracking target area is within the preset area, there is no need to control the camera 231 to rotate, and the image acquisition requirement can be met by maintaining the current orientation of the camera.

When the center position of the current tracking target area is not within the preset area, in order to control the camera 231 to rotate, the controller 250 may calculate the amount of rotation angle according to the user position, and generate a control instruction according to the amount of rotation angle to control the camera 231 to rotate.

In some embodiments, after determining that the center position of the current tracking target area is not within the preset area, the controller 250 may firstly calculate the distance between the center position of the tracking target area and the center point of the image area; then calculate the rotation angle according to the calculated distance combined with the maximum angle of view of the lens component of the camera 231 and the image size; and finally send the calculated rotation angle to the camera 231 in the form of a control instruction, so that the motor in the camera 231 drives each rotating shaft to rotate, thereby adjusting the orientation of the lens component.

Figure 14:
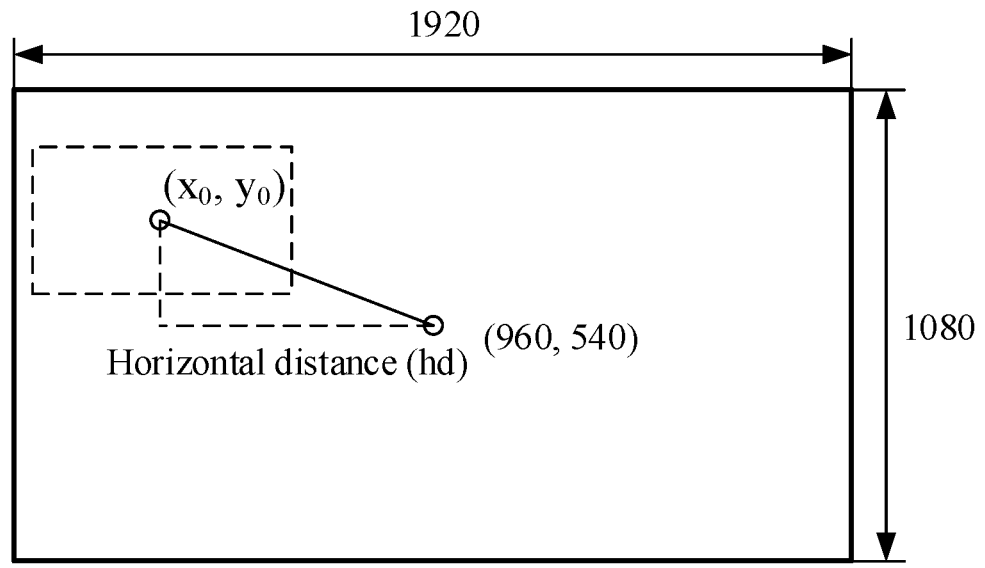
FIG. 14 shows a schematic diagram of calculating an offset of the center position of the tracking target area according to an embodiment of the disclosure.
Figure 15:
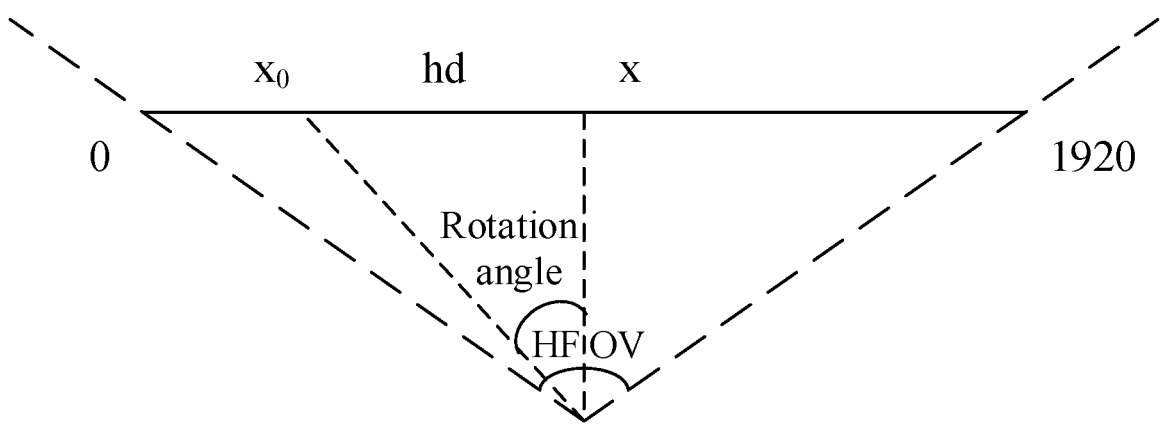
FIG. 15 shows a schematic diagram of calculating a rotation angle according to an embodiment of the disclosure.

For example, as shown in FIG. 14 and FIG. 15, the preview resolution of the camera 231 is 1920×1080, and the horizontal width of the image is: imgWidth=1920; the coordinate of the horizontal center position of the image is x=960; the coordinate of the center position of the tracking target area is ($x_0$, $y_0$), and the coordinate of the horizontal center position is $x_0$; the horizontal viewing angle is hfov; then the distance between the center position of the tracking target area and the center point of the image area is: hd=x−$x_0$, and then the rotation angle of the camera 231 in the horizontal direction may be calculated according to the following formula:

$$\theta = \arctan\left(\frac{2|x - x_0| \times \tan(hfov)}{imgWidth}\right)$$

Through the above formula, the angle to be adjusted by the camera 231 can be calculated. The controller 250 then compares the center position of the tracking target area with the coordinate value of the center point of the image area to determine the orientation of the center position of the tracking target area relative to the center point of the image area, so as to determine the rotation direction of the camera 231. That is, if the horizontal coordinate of the center position of the tracking target area is greater than the horizontal coordinate of the center of the image, the camera 231 is rotated to the right; otherwise, the camera 231 is rotated to the left. In an embodiment of the disclosure, the camera 231 may adopt the rear camera mode, so that the image displayed on the screen and the image captured by the camera are in a left-right mirror relationship, that is, the horizontal angle rotation to the left/right is opposite.

After determining the rotation angle and direction, the controller 250 may package the rotation angle and direction data to generate a control instruction, and send the control instruction to the camera 231. The motor in the camera 231 may rotate after receiving the control instruction, so as to drive the lens component to rotate through the rotating shaft and adjust the orientation of the lens component.

It should be noted that the horizontal coordinate is taken as an example for determination and adjustment in the above embodiment. In practical applications, the same adjustment may also be performed on the lens component by determining the difference in the vertical direction between the center position of the tracking target area and the position of the center point of the image area. The adjustment method is similar to the adjustment method in the horizontal direction, that is, after determining that the current user position is not within the preset area, the controller 250 may firstly calculate the vertical distance between the center position of the tracking target area and the center point of the image area; then calculate the rotation angle according to the calculated vertical distance combined with the maximum angle of view of the lens component of the camera 231 in the vertical direction and the image size; and finally send the calculated rotation angle to the camera 231 in the form of a control instruction, so that the motor in the camera 231 drives the second rotating shaft to rotate, thereby adjusting the orientation of the lens component.

In some embodiments, in order to track a multi-person area, after sending the rotation instruction to the camera, the controller 250 may further obtain a reference image periodically through the camera and detect the tracking target area in the reference image, so that a tracking instruction is regenerated according to the position of the tracking target area when the tracking target area is not within the preset area, and then a tracking instruction is sent to the camera 231. By obtaining the reference image periodically, the tracking target area can be continuously detected and adjusted to track the position of the main person during use.

As can be seen from the above, in the camera tracking method in the above embodiments, the tracking target area can be extracted from the reference image by obtaining the reference image captured by the camera 231 in combination with the current imaging parameter(s) of the camera 231, so as to send the rotation instruction to the camera 231 to adjust the shooting direction of the camera 231. The method can improve the detection process of the multi-object scenario in the image recognition process, and set the weight ratio according to the target distance, the area of a face region, etc., so as to filter undesired detected face region(s) according to the weight ratio to determine a tracking target area, and finally determine the deviation between the tracking target area and the preset area in the image, and adjust the orientation of the camera 231 according to the determination result, thereby tracking desired objects.

It should be noted that, in order to track the multi-person area, the controller 250 may perform the above analysis on a plurality of images captured by the camera 231 at a set frequency. By analyzing the plurality of images, it can determine the positions of the person areas at multiple moments, so as to continuously adjust the camera 231 so that the photographed portraits of multiple persons are always located in the reasonable areas of the images. Obviously, the higher the frequency of the above analysis, the more timely the camera 231 tracks the person(s), but the greater the amount of processing resources required for the analysis process. Therefore, the frequency of analysis may be set according to the control accuracy of the camera 231 and the processing capability of the controller 250.

Based on the above-mentioned camera tracking method, some embodiments further provide a display apparatus 200, including: a display 275, an interface component and a controller 250; where the display 275 is configured to display an image from broadcast system or Internet, and/or, a user interface; the interface component is configured to connect with a rotatable camera 231 configured to capture an image; and the controller 250 is configured to cause the display apparatus to perform: obtaining a reference image captured by the camera 231; extracting a tracking target area from the reference image according to a current imaging parameter of the camera 231, where the tracking target area is a regular-shaped area calculated according to weights of a plurality of face patterns; and sending a rotation instruction to the camera 231 to adjust an orientation of the camera 231 so that the tracking target area is located in the middle area of the image.

In the above-mentioned embodiments, the camera 231 may be arranged outside of the display apparatus and connected with the display apparatus via the interface component, and the above-mentioned camera tracking method is implemented in combination with the display apparatus 200. In some embodiments, the camera 231 may also be directly built into the display apparatus 200, that is, the display apparatus 200 includes the display 275, the camera 231 and the controller 250, where the camera 231 may be directly connected with the controller 250, so that the reference image is obtained directly by the camera 231, and the camera 231 is directly controlled to rotate according to the detection result on the reference image, thereby completing the camera tracking method.

What is claimed is:

1. A display apparatus, comprising:
   a display configured to display an image from broadcast system or Internet, and/or, a user interface;
   an interface component configured to connect with a rotatable camera, wherein the rotatable camera has a lens component and is configured to capture an image;
   a controller in connection with the display and interface component and configured to cause the display apparatus to perform:
   obtaining a reference image captured by the camera, wherein the reference image comprises one or more persons with one or more face patterns;
   extracting a tracking target area from the reference image according to a current imaging parameter of the camera, wherein the tracking target area is a rectangle determined according to one or more weights for the one or more face patterns, the current imaging parameter of the camera comprises a focal length of the lens component of the camera; and sending a rotation instruction to the camera to adjust an orientation of the camera to cause the tracking target area to be located in a middle area of an image presented on the display;

wherein, the controller is further configured to cause the display apparatus to perform:

obtaining the current imaging parameter of the camera;

calculating a target distance corresponding to a first face region in the reference image between a first person corresponding to the first face region and the lens component of the camera according to the imaging parameter and the size of the first face region;

determining a weight for the first face region according to an area of the first face region and the target distance; and extracting the tracking target area according to the weight of the first face region;

wherein the controller is configured to determine weight for the first face region according to the area of the first face region and the target distance by:

obtaining a table with a group of area intervals, a group of distance intervals and weights for the group of area intervals and the group of distance intervals stored in the display apparatus;

comparing the area of the first face region with the group of area intervals to determine a first weight for the first face region, and comparing the target distance with the group of distance intervals to determine a second weight for the target distance; and calculating a weight of the first face region according to the first weight and the second weight.

2. The display apparatus according to claim 1, wherein, the controller is further configured to cause the display apparatus to perform:

obtaining key points similar in shape to face organs in the reference image;

generating a set of key points according to classification of key points whose distances meet a recognition range;

extracting coordinates of a first portion of key points at boundary positions in the set of key points; and extracting a face region according to the coordinates of the first portion of the key points at the boundary positions.

3. The display apparatus according to claim 1, wherein, the controller is further configured to cause the display apparatus to perform:

obtaining a weight threshold;

in response to the weight for the first face region being greater than or equal to the weight threshold, retaining the first face region in the reference image during extraction of the tracking target area;

in response to the weight for the first face region being less than the weight threshold, ignoring the first face region in the reference image during extraction of the tracking target area.

4. The display apparatus according to claim 1, wherein, the controller is further configured to cause the display apparatus to perform:

obtaining coordinates at boundary positions of the tracking target area;

calculating a center position of the tracking target area according to the coordinates at boundary positions;

determining a difference between the center position of the tracking target area and coordinate of a center point of the image;

in response to the difference being within a preset interval, controlling the display to present the image captured by the camera in real time;

in response to the difference being not within the preset interval, generating a rotation instruction according to the difference and send the rotation instruction to the camera.

5. The display apparatus according to claim 4, wherein, the controller is further configured to cause the display apparatus to perform:

calculating a distance and a positional relationship between the center position of the tracking target area and a center point of the reference image;

calculating a rotation direction according to the positional relationship;

calculating a rotation angle according to the distance between the center position of the tracking target area and a center point of the reference image, a maximum angle of view of the lens component of the camera and an image size of the reference image;

generating the rotation instruction based on the rotation direction and the rotation angle.

6. The display apparatus according to claim 1, wherein the controller is further configured to cause the display apparatus to perform:

detecting a position of another tracking target area in another reference image obtained from the camera periodically;

in response to said another tracking target area being not within a preset area, generating a tracking instruction according to the position of said another tracking target area, wherein the tracking instruction comprises a rotation direction and a rotation angle;

sending the tracking instruction to the camera.

7. The display apparatus according to claim 1, wherein different area intervals in the group of area intervals have different weights, and different distance intervals in the group of distance intervals have different weights.

8. A method for a display apparatus, comprising:

obtaining a reference image captured by a camera, wherein the reference image comprises one or more persons with one or more face patterns; wherein the display apparatus comprises a display configured to display an image from broadcast system or Internet, and/or, a user interface, an interface component configured to connect with the camera being rotatable, wherein the rotatable camera has a lens component and is configured to capture an image;

extracting a tracking target area from the reference image according to a current imaging parameter of the camera, wherein the tracking target area is a rectangle determined according to one or more weights for the one or more face patterns, the current imaging parameter of the camera comprises a focal length of the lens component of the camera; and sending a rotation instruction to the camera to adjust an orientation of the camera to cause the tracking target area to be located in a middle area of an image presented on the display;

wherein the method further comprises:

obtaining the current imaging parameter of the camera;

calculating a target distance corresponding to a first face region in the reference image between a first person corresponding to the first face region and the lens component of the camera according to the imaging parameter and the size of the first face region;

determining a weight for the first face region according to an area of the first face region and the target distance; and extracting the tracking target area according to the weight of the first face region;

wherein determining weight for the first face region according to the area of the first face region and the target distance comprises:

obtaining a table with a group of area intervals, a group of distance intervals and weights for the group of area intervals and the group of distance intervals stored in the display apparatus;

comparing the area of the first face region with the group of area intervals to determine a first weight for the first face region, and comparing the target distance with the group of distance intervals to determine a second weight for the target distance; and calculating a weight of the first face region according to the first weight and the second weight.

9. The method according to claim 8, further comprising:

obtaining key points similar in shape to face organs in the reference image;

generating a set of key points according to classification of key points whose distances meet a recognition range;

extracting coordinates of a first portion of key points at boundary positions in the set of key points; and extracting a face region according to the coordinates of the first portion of the key points at the boundary positions.

10. The method according to claim 8, further comprising:

obtaining a weight threshold;

in response to the weight for the first face region being greater than or equal to the weight threshold, retaining the first face region in the reference image during extraction of the tracking target area;

in response to the weight for the first face region being less than the weight threshold, ignoring the first face region in the reference image during extraction of the tracking target area.

11. The method according to claim 8, further comprising:

obtaining coordinates at boundary positions of the tracking target area;

calculating a center position of the tracking target area according to the coordinates at boundary positions;

determining a difference between the center position of the tracking target area and coordinate of a center point of the image;

in response to the difference being within a preset interval, controlling the display to present the image captured by the camera in real time;

in response to the difference being not within the preset interval, generating a rotation instruction according to the difference and send the rotation instruction to the camera.

12. The method according to claim 11, further comprising:

calculating a distance and a positional relationship between the center position of the tracking target area and a center point of the reference image;

calculating a rotation direction according to the positional relationship;

calculating a rotation angle according to the distance between the center position of the tracking target area and a center point of the reference image, a maximum angle of view of the lens component of the camera and an image size of the reference image;

generating the rotation instruction based on the rotation direction and the rotation angle.

13. The method according to claim 8, further comprising:

detecting a position of another tracking target area in another reference image obtained from the camera periodically;

in response to said another tracking target area being not within a preset area, generating a tracking instruction according to the position of said another tracking target area, wherein the tracking instruction comprises a rotation direction and a rotation angle;

sending the tracking instruction to the camera.

14. The method according to claim 8, wherein different area intervals in the group of area intervals have different weights, and different distance intervals in the group of distance intervals have different weights.

* * * * *